US012206169B2

(12) United States Patent
Wu et al.

(10) Patent No.: US 12,206,169 B2
(45) Date of Patent: Jan. 21, 2025

(54) ANTENNA MODULE

(71) Applicant: PEGATRON CORPORATION, Taipei (TW)

(72) Inventors: Chien-Yi Wu, Taipei (TW); Chao-Hsu Wu, Taipei (TW); Cheng-Hsiung Wu, Taipei (TW); Chia-Hung Chen, Taipei (TW); Shih-Keng Huang, Taipei (TW); Hau Yuen Tan, Taipei (TW); Sheng-Chin Hsu, Taipei (TW); Tse-Hsuan Wang, Taipei (TW); Hao-Hsiang Yang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 139 days.

(21) Appl. No.: 17/965,339

(22) Filed: Oct. 13, 2022

(65) Prior Publication Data

US 2023/0155296 A1 May 18, 2023

(30) Foreign Application Priority Data

Nov. 16, 2021 (TW) ................................ 110142544

(51) Int. Cl.
*H01Q 13/16* (2006.01)
*H01Q 21/06* (2006.01)

(52) U.S. Cl.
CPC ........... *H01Q 13/16* (2013.01); *H01Q 21/064* (2013.01)

(58) Field of Classification Search
CPC ...... H01Q 13/16; H01Q 21/064; H01Q 1/243; H01Q 9/42; H01Q 1/52; H01Q 1/521
See application file for complete search history.

(56) References Cited

U.S. PATENT DOCUMENTS

| | | | | | |
|---|---|---|---|---|---|
| 6,373,446 | B2 * | 4/2002 | Apostolos | H01Q 21/24 | 343/742 |
| 2002/0140607 | A1 * | 10/2002 | Zhou | H01Q 9/14 | 343/702 |
| 2003/0112198 | A1 * | 6/2003 | Wang | H01Q 5/371 | 343/702 |
| 2017/0317419 | A1 * | 11/2017 | Wu | H01Q 9/0421 | |
| 2020/0006850 | A1 * | 1/2020 | Filatov | H01Q 1/48 | |

(Continued)

FOREIGN PATENT DOCUMENTS

| | | |
|---|---|---|
| TW | 201511481 | 3/2015 |
| TW | I712217 | 12/2020 |

*Primary Examiner* — Dimary S Lopez Cruz
*Assistant Examiner* — Austin M Back
(74) *Attorney, Agent, or Firm* — J.C. PATENTS

(57) ABSTRACT

An antenna module includes two antenna units, two isolation members, and a grounding member. Each antenna unit consists of two feeding ends, two first radiators, and two second radiators. The isolating members are disposed between the first and second portions of each antenna unit. The grounding member is disposed beside the two antenna units and the two isolation members. A first slot is formed among each first radiator, the second radiator, and the grounding member. The two second radiators are connected to the third radiator. A third slot is formed between the second radiator and the second portion. The two antenna units are symmetric to the fourth slot in a mirrored manner, and the two first portions have widths gradually changing along an extending direction of the fourth position.

10 Claims, 7 Drawing Sheets

(56) References Cited

U.S. PATENT DOCUMENTS

2022/0052442 A1* 2/2022 Varnoosfaderani .......................... H01Q 21/065
2022/0320724 A1* 10/2022 Deng .................... H01Q 1/523

* cited by examiner

ANTENNA MODULE

CROSS-REFERENCE TO RELATED APPLICATION

This application claims the priority benefit of Taiwan application serial no. 110142544, filed on Nov. 16, 2021. The entirety of the above-mentioned patent application is hereby incorporated by reference herein and made a part of this specification.

BACKGROUND

Technical Field

The disclosure relates to an antenna module, and more particularly, to an antenna module with two antenna units.

Description of Related Art

Generally speaking, if two antennas are disposed on a small-sized plane without a matching circuit and a parasitic pattern located on different layers, it is difficult to achieve good performance on isolation between two antennas.

SUMMARY

The disclosure provides an antenna module, which has two antenna units and may have good isolation.

An antenna module in the disclosure includes two antenna units, two isolation members, and a grounding member. The two antenna units include two feeding ends, two first radiators extending from the two feeding ends, and two second radiators extending from the two feeding ends. The two isolation members are disposed between the two antenna units, and include two first portions adjacent to each other and two second portions adjacent to the two second radiators. The grounding member is disposed beside the two antenna units and the two isolation members, and the two second radiators and the two second portions are connected to the grounding member. A first slot is formed among each first radiator, the corresponding second radiator, and the grounding member. A second slot is formed between each first radiator and the corresponding second radiator. A third slot is formed between each second radiator and the corresponding second portion. A fourth slot is formed between the two first portions. The two antenna units and the two isolation members are mirrored by the fourth slot, and the two first portions have widths gradually changing along an extending direction of the fourth slot.

In an embodiment of the disclosure, the two first portions include two right triangle regions, and each of the second portions is connected to a corner of the corresponding right triangle region.

In an embodiment of the disclosure, the two right triangular regions include two beveled edges. The two second portions include two vertical edges connected to the two beveled edges. The two beveled edges and the two vertical edges collectively form an M shape.

In an embodiment of the disclosure, each of the first radiators includes a first section, a second section, and a third section that are sequentially connected. An opening is surrounded by the first section, the second section, and the third section. The second slot communicates with the opening.

In an embodiment of the disclosure, the second slot is formed between the second section and the second radiator, between the third section and the second radiator, and between the first section and the third section.

In an embodiment of the disclosure, an end of each of the second radiators away from the feeding end is connected to an end of the corresponding second portion away from the first portion, and the end of the second radiator and the end of the second portion are collectively connected to the grounding member.

In an embodiment of the disclosure, a width of a portion of the first section beside the opening is greater than a total width of the end of the second radiator and the end of the second portion.

In an embodiment of the disclosure, a total width of the end of the second radiator and the end of the second portion is greater than a width of the second section.

In an embodiment of the disclosure, each of the second sections includes a terminal away from the corresponding first section, and the terminal of one of the second sections faces the terminal of the other of the second sections.

In an embodiment of the disclosure, each of the second radiators includes a fourth section, a fifth section, a sixth section, and a seventh section that are sequentially connected. The fourth section extends from the feeding end. The seventh section is connected to the grounding member. The first slot is formed between the fourth section and the grounding member and between the fifth section and the seventh section.

In an embodiment of the disclosure, the third slot is formed between the seventh section and the corresponding second portion.

Based on the above, the two antenna units of the antenna module in the disclosure are disposed in the mirrored manner, and in each of the two antenna units, the first slot is formed among the first radiator, the corresponding second radiator, and the grounding member. The second slot is formed between the first radiator and the corresponding second radiator. The widths of the first slot and the second slot may be configured to adjust center frequencies and impedance matching of a high frequency band and a low frequency band. In addition, in the antenna module in the disclosure, the two isolation members are disposed between the two antenna units, so as to improve the isolation between the two antenna units. The third slot is formed between each second radiator and the corresponding second portion. The fourth slot is formed between the two first portions of the two isolation members. The third slot and the fourth slot may be configured to adjust the center frequency of the isolation between the two antenna units. The two first portions of the two isolation members have the widths changing along the extending direction of the fourth slot, which helps to improve the isolation.

DETAILED DESCRIPTION OF DISCLOSED EMBODIMENTS

Figure 1:
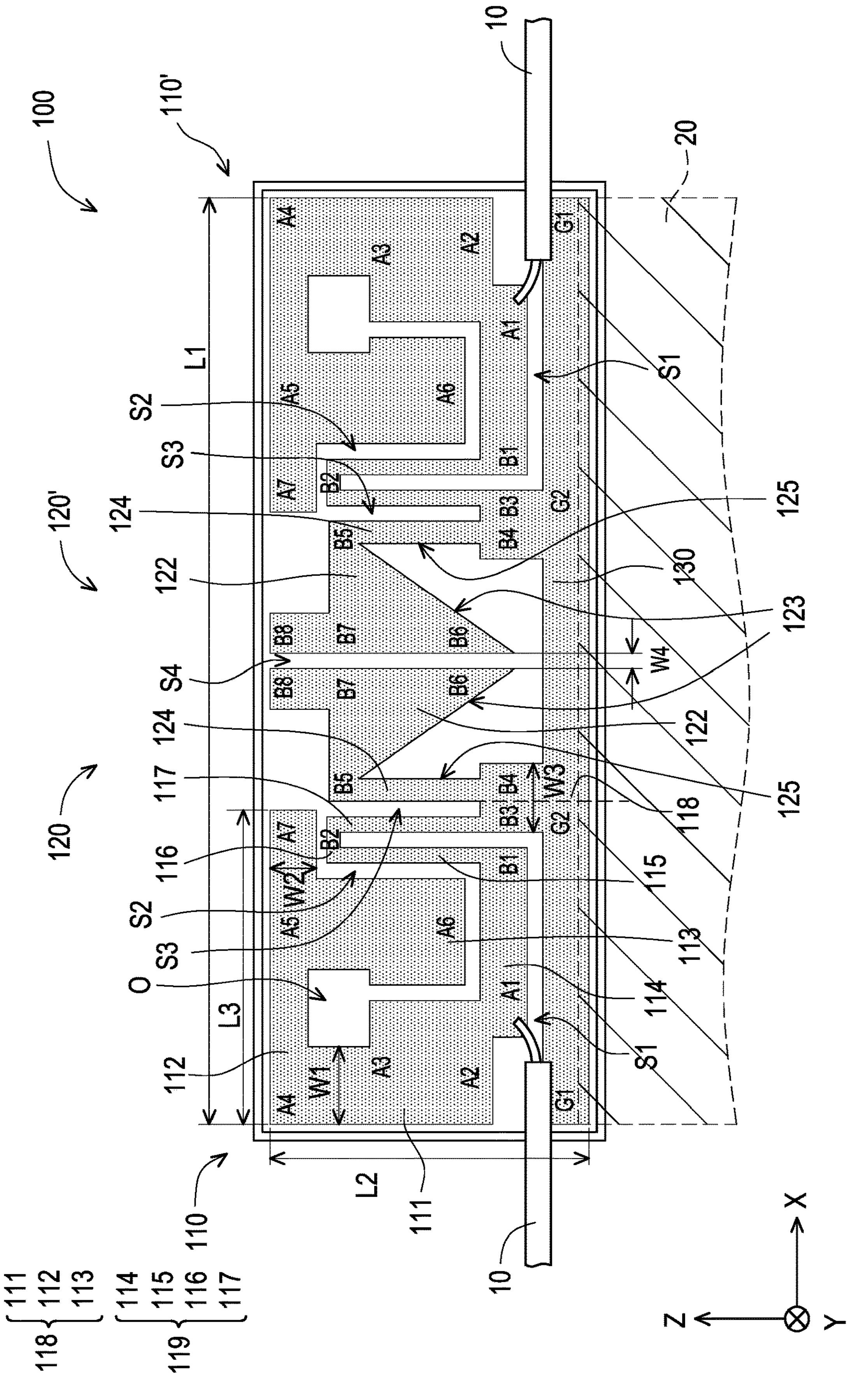
FIG. 1 is a schematic diagram of an antenna module according to an embodiment of the disclosure.

FIG. 1 is a schematic diagram of an antenna module according to an embodiment of the disclosure. Referring to FIG. 1, an antenna module 100 in this embodiment includes two antenna units 110 and 110', two isolation members 120 and 120', and a grounding member 130. Patterns of the two antenna units 110 and 110' are the same, and are symmetrically disposed on the left and right sides in a mirrored manner. Therefore, the two antenna units 110 and 110' are only disposed in a left-right reversed manner. The two isolation members 120 and 120' are disposed between the two antenna units 110 and 110'. The grounding member 130 is disposed beside the two antenna units 110 and 110' and the two isolation members 120 and 120', for example, a lower part of FIG. 1.

The two antenna units 110 and 110' include two feeding ends (positions A1), two first radiators 118 (positions A1 to A7) extending from the two feeding ends (the positions A1), and two second radiators 119 (positions A1 and B1 to B3) extending from the two feeding ends (the positions A1). Since the patterns of the two antenna units 110 and 110' are the same, and patterns of the two isolation members 120 and 120' are the same, the left antenna unit 110 and the left isolation member 120 of FIG. 1 are used for description below.

The first radiator 118 includes a first section 111 (the positions A1 to A4), a second section 112 (the positions A4 to A7), and a third section 113 (the positions A5 to A6) that are sequentially connected in a bending manner. An opening O is surrounded by the first section 111 (the positions A1 to A4), the second section 112 (the positions A4 to A7), and the third section 113 (the positions A5 to A6).

The second section 112 (the positions A4 to A7) includes a terminal (the position A7) away from the first section 111 (the positions A1 to A4). According to FIG. 1, the terminal (the position A7) of the second section 112 of the left antenna unit 110 faces to the right while the terminal (the position A7) of the second section 112 of the right antenna unit 110' faces to the left. That is to say, the two terminals (the positions A7) face each other, and such a design may have a better antenna effect.

The second radiator 119 includes a fourth section 114 (the positions A1 to B1), a fifth section 115 (the positions B1 to B2), a sixth section 116 (the position B2), and a seventh section 117 (the positions B2 to B3) that are sequentially connected in the bending manner. The fourth section 114 (the positions A1 to B1) extends from the feeding end (the position A1), and the seventh section 117 (the positions B2 to B3) is connected to the grounding member 130 (positions G1, G2, G2, and G1).

In addition, in this embodiment, a first slot S1 is formed among the first radiator 118, the second radiator 119, and the grounding member 130. Specifically, the first slot S1 is formed between the fourth section 114 (the positions A1 to B1) and the grounding member 130 and between the fifth section 115 (the positions B1 to B2) and the seventh section 117 (the positions B2 to B3). The first slot S1 may be configured to adjust a central frequency and impedance matching of a high frequency band (5500 to 6500 MHz).

A second slot S2 is formed between the first radiator 118 and the second radiator 119, and the second slot S2 communicates with the opening O. Specifically, the second slot S2 is formed between the position A7 of the second section 112 and the position B2 of the second radiator 119, among the third section 113 (the positions A5 to A6), the fifth section 115 and the fourth section 114 of the second radiator 119, and between the positions A1 to A3 of the first section 111 and the position A6 of the third section 113.

The second slot S2 may be configured to adjust center frequencies and impedance matching of a low frequency band (2400 to 2484 MHz) and a double frequency band (5150 to 5500 MHz), and may be further configured to adjust the center frequency and impedance matching of the high frequency band (6500 to 7500 MHz).

In addition, the two isolation members 120 and 120' are located between the two antenna units 110 and 110', and separated from each other. The two isolation members 120 and 120' include two first portions 122 (positions B5 to B8) adjacent to each other and two second portions 124 (positions B4 to B5) adjacent to the two second radiators. The two first portions 122 have widths gradually changing along an up-down direction in FIG. 1. Specifically, in this embodiment, the two first portions 122 (the positions B5 to B8) include two right triangle regions (the positions B5 to B7), and each of the second portions 124 is connected to a corner (the position B5) of the corresponding right triangle region.

In this embodiment, the two right triangle regions (the positions B5 to B7) include two beveled edges 123. The two second portions 124 include two vertical edges 125 connected to the two beveled edges 123. The two beveled edges 123 and the two vertical edges 125 collectively form an M shape. Therefore, the two isolation members 120 and 120' present a design of an M-shaped open loop.

In addition, the two second radiators 119 and the two second portions 124 are connected to the grounding member 130. Specifically, an end (the position B3) of the second radiator 119 away from the feeding end is connected to an end (the position B4) of the corresponding second portion 124 away from the first portion 122. The end (the position B3) of the second radiator 119 and the end (the position B4) of the second portion 124 are both connected to the grounding member 130 (the positions G1 to G2).

In this embodiment, a width W1 of a portion of the first section 111 beside the opening O is greater than a total width W3 of the end of the second radiator 119 at the position B3 and the end of the second portion 124 at the position B4. The total width W3 of the end of the second radiator 119 at the position B3 and the end of the second portion 124 at the position B4 is greater than a width W2 of the second section 112 (the positions A4 to A7). Such a design facilitates the isolation between the two antenna units 110 and 110' in low frequency bands, and the widths W1, W2, and W3 may be fine-tuned, so as to adjust a frequency point and the isolation.

Furthermore, a third slot S3 is formed between the second radiator 119 and the second portion 124. Specifically, the third slot S3 is formed between the seventh section 117 (the positions B2 to B3) of the second radiator 119 and the corresponding second portion 124 (the positions B4 to B5)

of the isolation member 120. In addition, a fourth slot S4 is formed between the two first portions 122 of the two isolation members 120 and 120'. The third slot S3 and the fourth slot S4 may be configured to adjust the isolation between the two antenna units 110 and 110' in the low frequency band and the high frequency band. According to FIG. 1, the two antenna units 110 and 110' and the two isolation members 120 and 120' are mirrored by the fourth slot S4. That is to say, the two antenna units 110 and 110' and the two isolation members 120 and 120' are located on the two sides of the fourth slot S4 in the mirrored manner.

In this embodiment, the antenna module 100 may be disposed on a circuit board with a length L1 of about 30 mm, a width L2 of about 10 mm, and a thickness of about 0.4 mm. A length L3 of the single antenna unit 110 is about 10 mm. Two positive ends of two coaxial transmission lines 10 are connected to the two feeding ends (the positions A1), and two negative ends of the two coaxial transmission lines 10 are connected to the grounding member 130 (the position G1). A conductor 20 (e.g., aluminum foil or copper foil) is connected to the grounding member 130 (the positions G1, G2, G2, and G1), and the conductor 20 is connected to a system grounding plane (not shown).

In the antenna module 100 of this embodiment, with the structure of a symmetrical dual-feed antenna, through the first slot S1, the second slot S2, the third slot S3, the fourth slot S4, and the M-shaped open loop formed by the two isolation members 120 and 120' extending from two grounding ends (the position B3), the antenna module 100 may generate characteristics of the antenna such as dual frequency bands, good isolation, and support for Wi-Fi 6E broadband (5150 to 7125 MHz). In addition, the antenna module 100 is small in size, and is suitable for large-sized or small-sized electronic devices.

Figure 2:
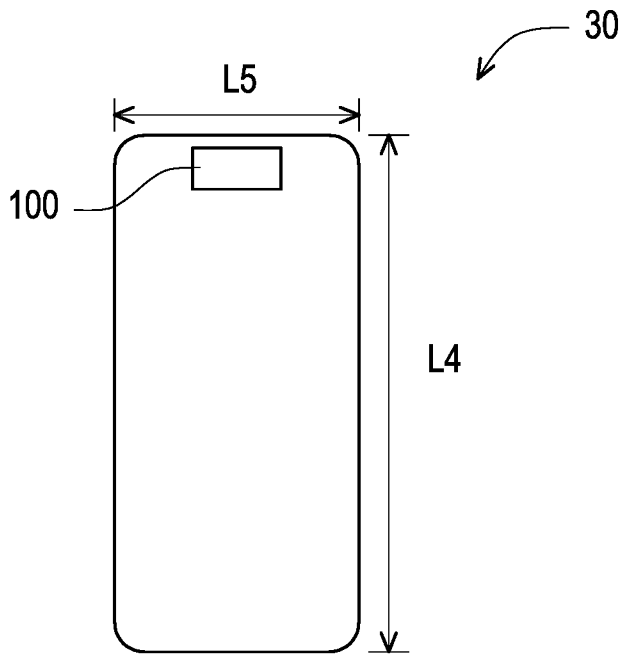
FIG. 2 is a schematic diagram of the antenna module of FIG. 1 applied to an electronic device.

FIG. 2 is a schematic diagram of the antenna module of FIG. 1 applied to an electronic device. Referring to FIG. 2, in this embodiment, the antenna module 100 of FIG. 1 is applied to an electronic device 30. The electronic device 30 is, for example, a voltage transforming device of the Internet of Things. However, the electronic device 30 may also be an AP router, and a type of the electronic device 30 is not limited thereto. A length L4 of the electronic device 30 is about 250 mm, and a width L5 is about 80 mm. The antenna module 100 may be disposed at a position close to a short side of the electronic device 30.

Figure 3:
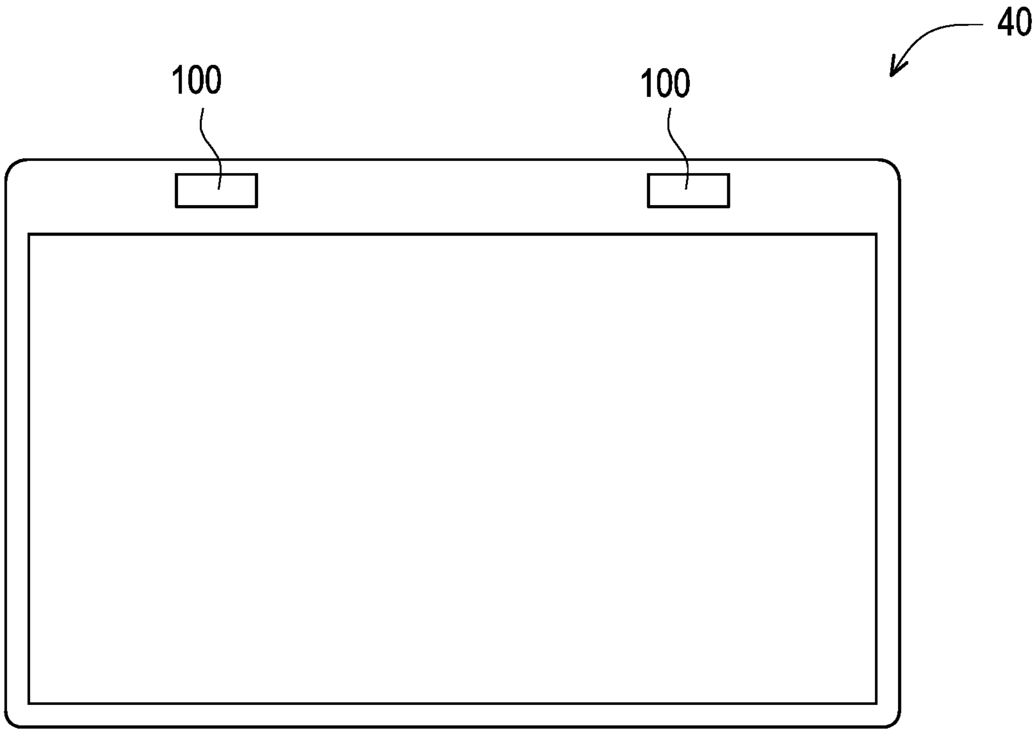
FIG. 3 is a schematic diagram of the antenna module of FIG. 1 applied to another electronic device.

FIG. 3 is a schematic diagram of the antenna module of FIG. 1 applied to another electronic device. Referring to FIG. 3, in this embodiment, an electronic device 40 applied to the antenna module 100 of FIG. 1 is an upper body of a laptop computer. The upper body of the laptop computer may be provided with the two antenna modules 100 on upper left and right sides of a screen.

Figure 4:
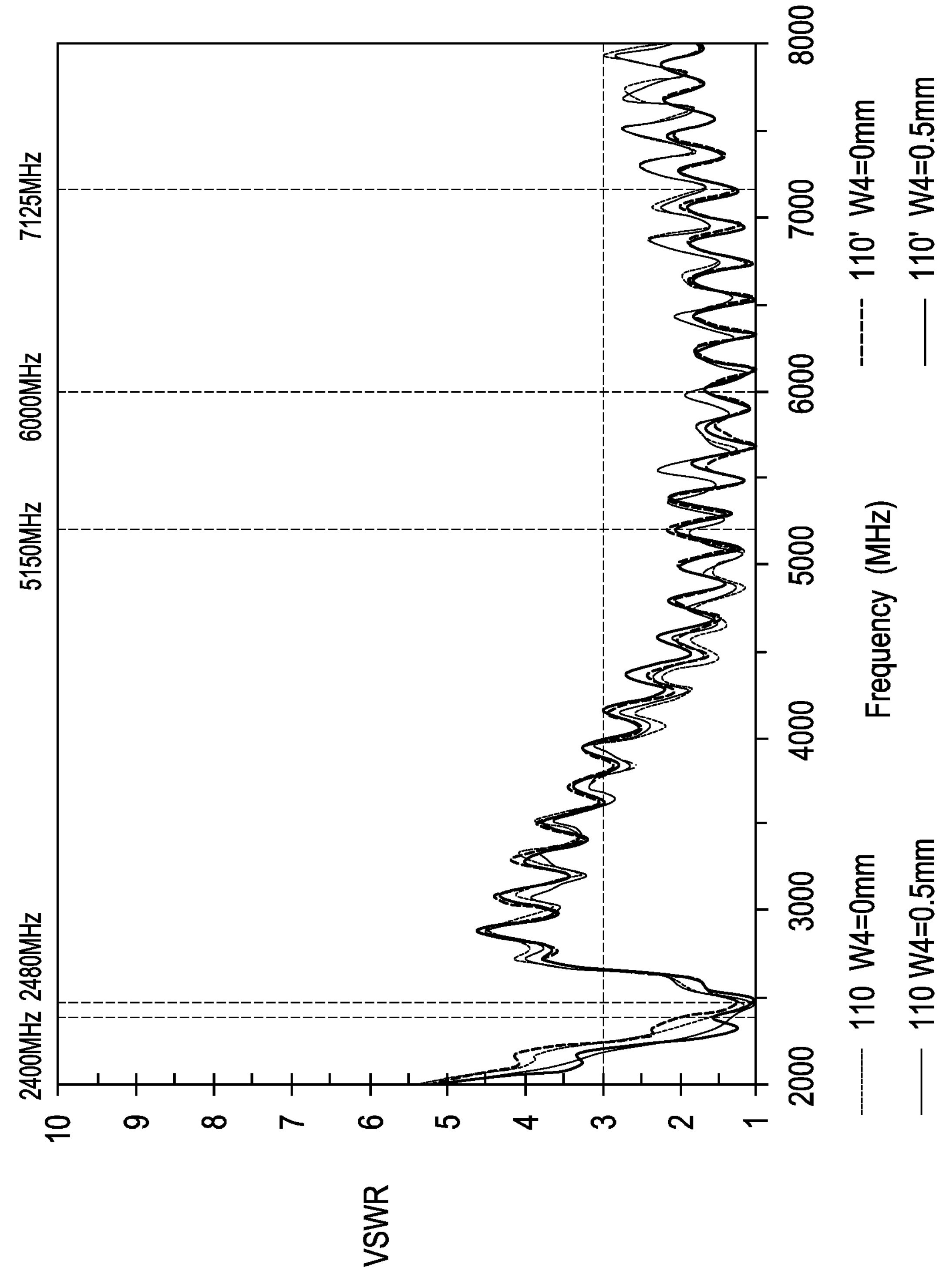
FIG. 4 is a plot diagram of frequency vs. VSWR of the antenna module of FIG. 1.

FIG. 4 is a plot diagram of frequency vs. VSWR of the antenna module of FIG. 1. It should be noted that in FIG. 4, VSWR values of the left antenna unit 110 and the right antenna unit 110' of the antenna module 100 of FIG. 1 when a width W4 of the fourth slot S4 is not 0 are shown, and the VSWR values of the left antenna unit 110 and the right antenna unit 110' when the width W4 of the fourth slot S4 is 0 (i.e., the two first portions 122 of the two isolation members 120 and 120' are adhered together) are shown.

The VSWR values of the left antenna unit 110 and the right antenna unit 110' of the antenna module 100 of FIG. 1 (when the width W4 of the fourth slot S4 is not 0, e.g., 0.5 mm) are denoted by solid lines while the VSWR values of the left antenna unit 110 and the right antenna unit 110' when the width W4 of the fourth slot S4 is zero are denoted by dashed lines.

Referring to FIG. 4, in FIG. 4, it may be seen that the VSWR values of the left antenna unit 110 and the right antenna unit 110' denoted by the solid lines when the width W4 of the fourth slot S4 is 0.5 mm have better performance than the VSWR values of the left antenna unit 110 and the right antenna unit 110' denoted by the dashed lines when the width W4 of the fourth slot S4 is 0 mm.

Figure 5:
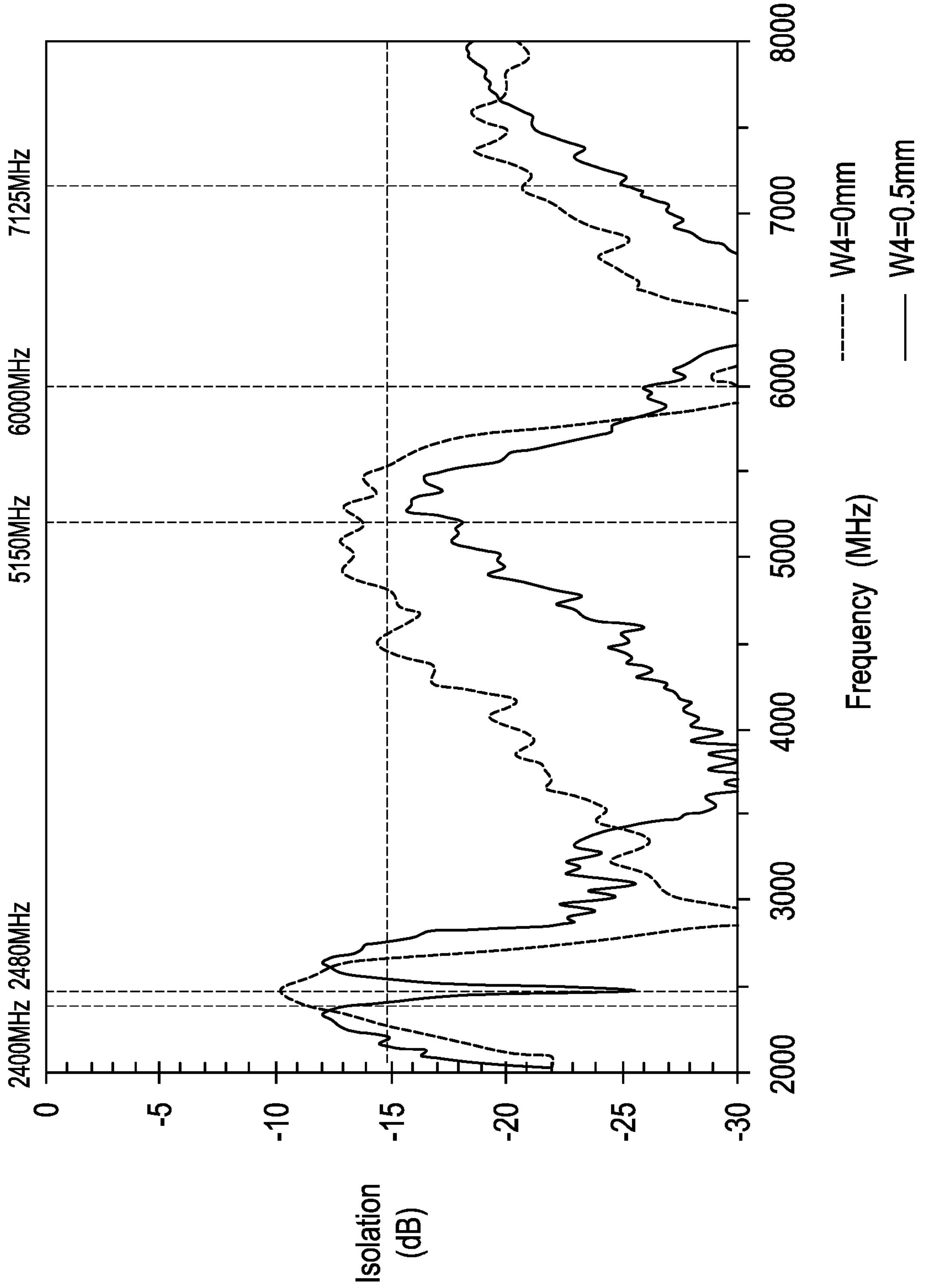
FIG. 5 is a plot diagram of frequency vs. isolation of the antenna module of FIG. 1.

FIG. 5 is a plot diagram of frequency vs. isolation of the antenna module of FIG. 1. Similarly, in FIG. 5, a solid line denotes the isolation of the antenna module 100 of FIG. 1, and a dashed line denotes the isolation of the antenna module 100 when the width W4 of the fourth slot S4 is zero. Referring to FIG. 5, according to the solid line and the dashed line, the isolation may be below 15 dB. However, compared to the dashed line, the isolation, denoted by the solid line, at two frequency points of 2400 MHz and 2484 MHz in the low frequency band may go from −10.5 dB to −16 dB. The isolation at the two frequency points of 5150 MHz and 5500 MHz in the high frequency band may go from −13.5 dB to −18 dB and from −15 dB to −19 dB.

Figure 6:
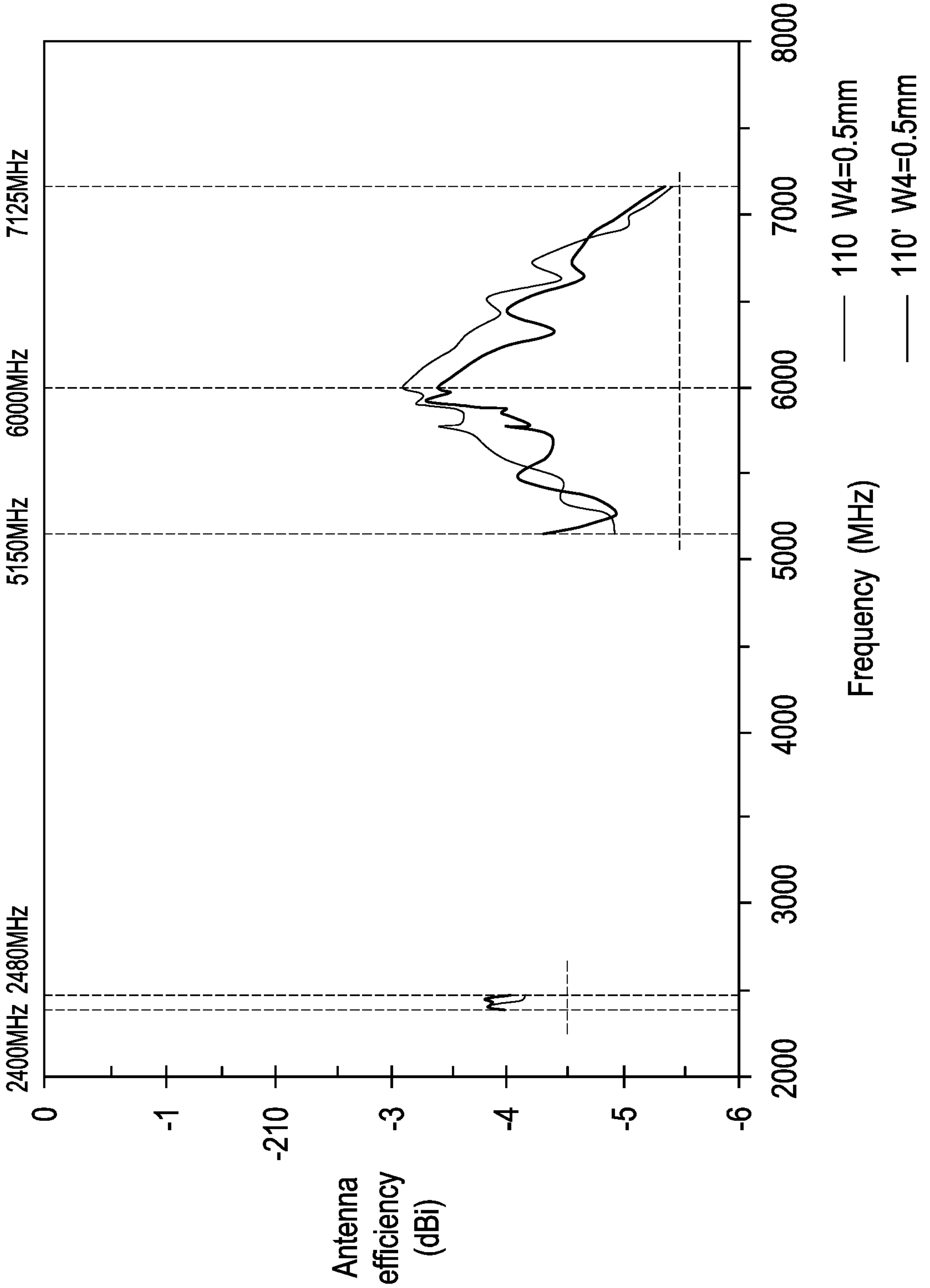
FIG. 6 is a plot diagram of frequency vs. antenna efficiency of the antenna module of FIG. 1.

FIG. 6 is a plot diagram of frequency vs. antenna efficiency of the antenna module of FIG. 1. Referring to FIG. 6, FIG. 6 illustrates antenna efficiency of the left antenna unit 110 and the right antenna unit 110' of the antenna module 100 of FIG. 1. The efficiency of the left antenna unit 110 and the right antenna unit 110' may be at −3.8 to −4.1 dBi in the low frequency band (2400 to 2484 MHz) of Wi-Fi 2.4G, and may be at −3.4 to −4.9 dBi in the high frequency band (5150 to 5850 MHz) of Wi-Fi 5G, and may be at −3.1 to −5.2 dBi in the high frequency band (5925 to 7125 MHz) of Wi-Fi 6E, which has characteristics of good antenna performance.

Figure 7A:
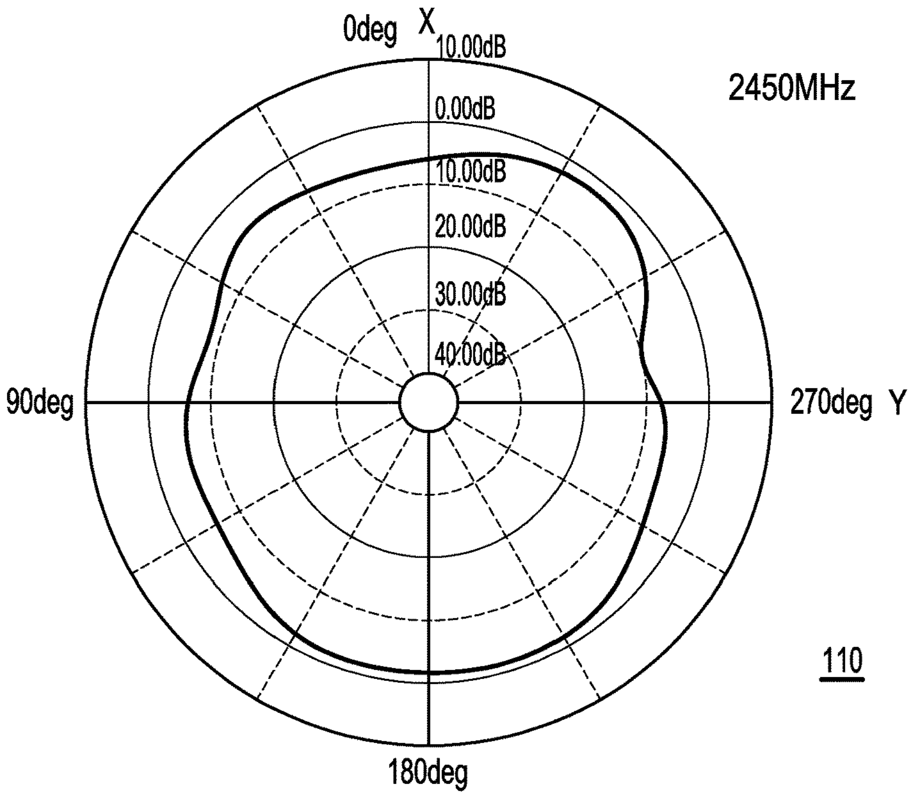
FIG. 7A is a radiation pattern of a left antenna unit of the antenna module of FIG. 1 at a frequency of 2450 MHz in the XY plane.
Figure 7B:
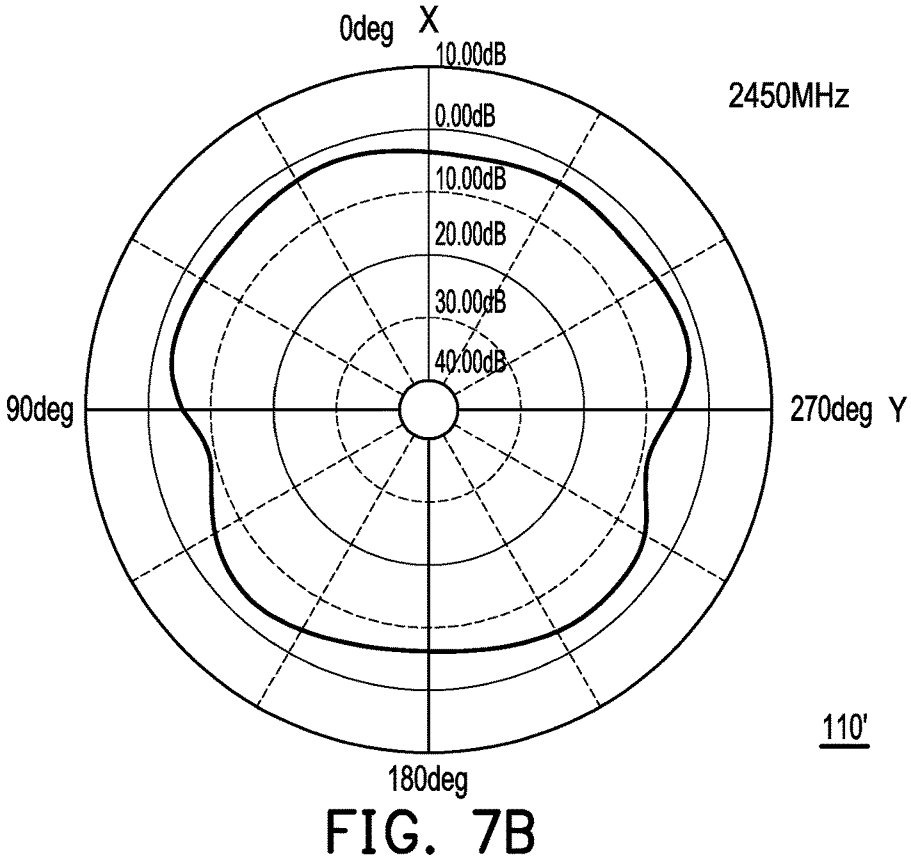
FIG. 7B is a radiation pattern of a right antenna unit of the antenna module of FIG. 1 at the frequency of 2450 MHz in the XY plane.
Figure 8A:
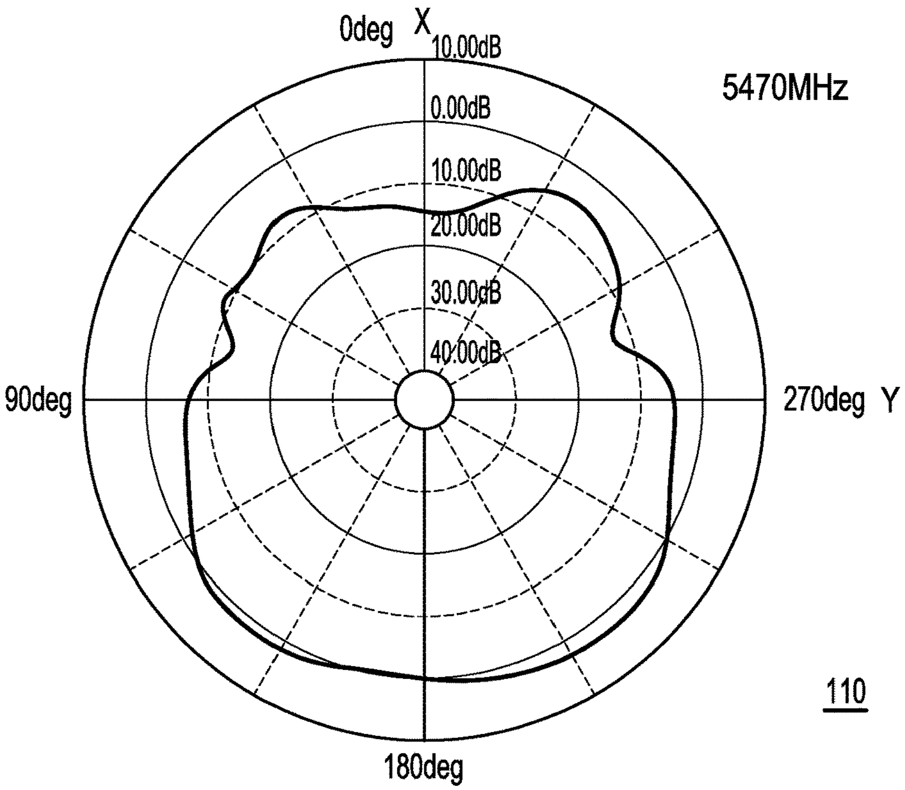
FIG. 8A is a radiation pattern of the left antenna unit of the antenna module of FIG. 1 at a frequency of 5470 MHz in the XY plane.
Figure 8B:
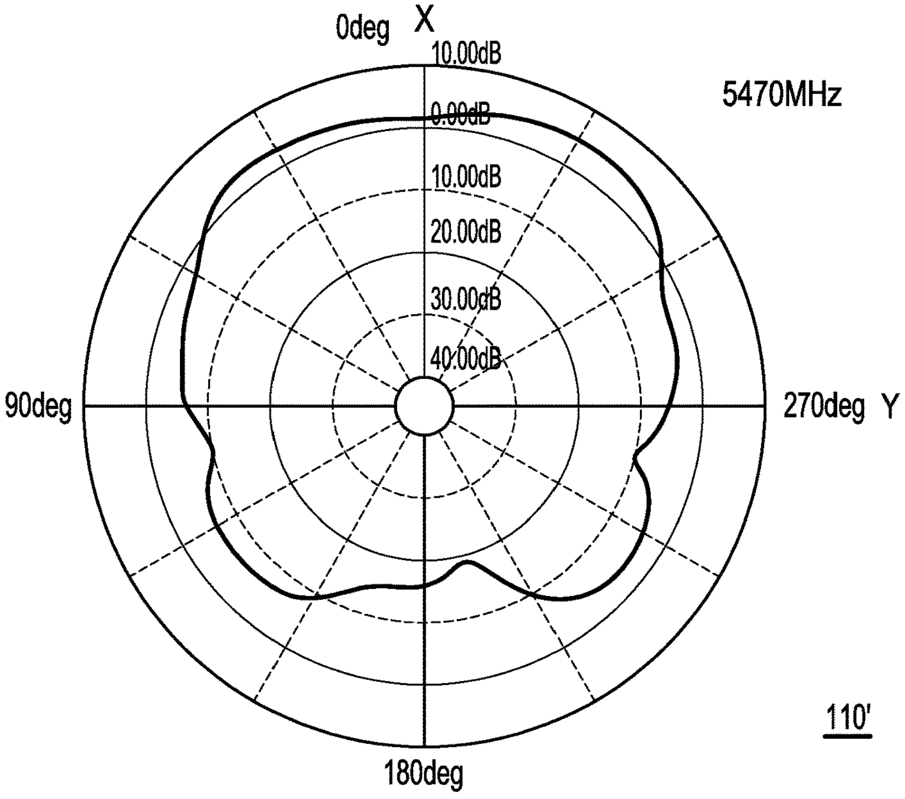
FIG. 8B is a radiation pattern of the right antenna unit of the antenna module of FIG. 1 at the frequency of 5470 MHz in the XY plane.

FIG. 7A is a radiation pattern of the left antenna unit of the antenna module of FIG. 1 at a frequency of 2450 MHz in the XY plane. FIG. 7B is a radiation pattern of the right antenna unit of the antenna module of FIG. 1 at the frequency of 2450 MHz in the XY plane. FIG. 8A is a radiation pattern of the left antenna unit of the antenna module of FIG. 1 at a frequency of 5470 MHz in the XY plane. FIG. 8B is a radiation pattern of the right antenna unit of the antenna module of FIG. 1 at the frequency of 5470 MHz in the XY plane.

Referring to FIGS. 7A to 8B, in this embodiment, radiation patterns of the left antenna unit 110 and the right antenna unit 110' have power coverage toward −X-axis and X-axis directions, respectively, and a degree of mutual influence between the radiation patterns of the two antennas is small. Therefore, ECC thereof may be less than 0.1.

Based on the above, the two antenna units of the antenna module in the disclosure are disposed in the mirrored manner, and the first slot is formed among the first radiator, the second radiator, and the grounding member in each of the antenna units. The second slot is formed between the first radiator and the corresponding second radiator. The widths of the first slot and the second slot may be configured to adjust the center frequencies and impedance matching of the high frequency band and the low frequency band. In addition, in the antenna module in the disclosure, the two isolation members are disposed between the two antenna units, so as to improve the isolation between the two antenna units. The third slot is formed between the second radiator and the corresponding second portion. The fourth slot is formed between the two first portions of the two isolation members. The third slot and the fourth slot may be configured to adjust the center frequency of the isolation between the two antenna units. The two first portions of the two isolation members have the widths changing along an extending direction of the fourth slot, which helps to improve the isolation.

What is claimed is:

1. An antenna module, comprising:

two antenna units comprising two feeding ends, two first radiators extending from the two feeding ends, and two second radiators extending from the two feeding ends;

two isolation members disposed between the two antenna units and comprising two first portions adjacent to each other and two second portions adjacent to the two second radiators; and a grounding member disposed beside the two antenna units and the two isolation members, wherein the two second radiators and the two second portions are connected to the grounding member, a first slot is formed among each first radiator, the corresponding second radiator, and the grounding member, a second slot is formed between each first radiator and the corresponding second radiator, a third slot is formed between each second radiator and the corresponding second portion, and a fourth slot is formed between the two first portions, the two antenna units and the two isolation members are mirrored by the fourth slot, and the two first portions have widths gradually changing along an extending direction of the fourth slot, wherein each of the second radiators comprises a fourth section, a fifth section, a sixth section, and a seventh section that are sequentially connected, the fourth section extends from the feeding end, the seventh section is connected to the grounding member, and the first slot is formed between the fourth section and the grounding member and between the fifth section and the seventh section.

2. The antenna module according to claim 1, wherein the two first portions comprise two right triangle regions, and each of the second portions is connected to a corner of the corresponding right triangle region.

3. The antenna module according to claim 2, wherein the two right triangular regions comprise two beveled edges, the two second portions comprise two vertical edges connected to the two beveled edges, and the two beveled edges and the two vertical edges collectively form an M shape.

4. The antenna module according to claim 1, wherein each of the first radiators comprises a first section, a second section, and a third section that are sequentially connected, an opening is surrounded by the first section, the second section, and the third section, and the second slot communicates with the opening.

5. The antenna module according to claim 4, wherein the second slot is formed between the second section and the second radiator, between the third section and the second radiator, and between the first section and the third section.

6. The antenna module according to claim 4, wherein an end of each of the second radiators away from the feeding end is connected to an end of the corresponding second portion away from the first portion, and the end of each second radiator and the end of the corresponding second portion are collectively connected to the grounding member.

7. The antenna module according to claim 6, wherein a width of a portion of the first section beside the opening is greater than a total width of the end of each second radiator and the end of the corresponding second portion.

8. The antenna module according to claim 6, wherein a total width of the end of each second radiator and the end of the corresponding second portion is greater than a width of the corresponding second section.

9. The antenna module according to claim 4, wherein each of the second sections comprises a terminal away from the corresponding first section, and the terminal of one of the second sections faces the terminal of the other of the second sections.

10. The antenna module according to claim 1, wherein the third slot is formed between the seventh section and the corresponding second portion.

* * * * *